United States Patent
Bolz et al.

(10) Patent No.: US 6,919,648 B2
(45) Date of Patent: Jul. 19, 2005

(54) MOTOR VEHICLE ELECTRIC SYSTEM

(75) Inventors: Stephan Bolz, Pfatter (DE); Rainer Knorr, Regensburg (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 10/634,422

(22) Filed: Aug. 5, 2003

(65) Prior Publication Data

US 2004/0112320 A1 Jun. 17, 2004

Related U.S. Application Data

(63) Continuation of application No. PCT/DE01/00601, filed on Feb. 16, 2001.

(51) Int. Cl.$^7$ .................................................. H02P 9/04
(52) U.S. Cl. ...................................... 290/40 C; 322/16
(58) Field of Search ........................ 290/40 C, 16; 318/139; 322/16, 10

(56) References Cited

U.S. PATENT DOCUMENTS

| | | | | |
|---|---|---|---|---|
| 5,552,681 A | * | 9/1996 | Suzuki et al. | 318/139 |
| 5,650,713 A | * | 7/1997 | Takeuchi et al. | 322/16 |
| 5,998,976 A | * | 12/1999 | Steffan | 322/10 |
| 6,670,788 B2 | * | 12/2003 | Prabhu et al. | 320/104 |
| 6,718,927 B2 | * | 4/2004 | Goetze et al. | 123/179.3 |

FOREIGN PATENT DOCUMENTS

| | | | |
|---|---|---|---|
| DE | 199 03 427 A1 | 8/2000 | ............. H02J/7/14 |
| EP | 0 533 037 A1 | 9/1992 | ............ B60R/16/02 |
| EP | 1 013 506 A2 | 10/1999 | ............ B60R/16/02 |

* cited by examiner

*Primary Examiner*—Darren Schuberg
*Assistant Examiner*—Leda Pham
(74) *Attorney, Agent, or Firm*—Baker Botts L.L.P.

(57) ABSTRACT

A starter-generator (ISG) is mechanically connected to an internal combustion engine (BKM), comprises a bi-directional AC/DC converter (1), and can be connected to an accumulator (B1) by means of a first switch (S1), and connected to a double layer capacitor (DLC) by means of a second switch (S2). The accumulator (B1) is either connected to the double layer capacitor (DLC) by means of a control circuit (PWM), or the accumulator (B1) and the double layer capacitor (DLC) are connected to a bidirectional DC/DC converter (3) and to a second accumulator (B2) by means of a third switch (S3) and a fourth switch (S4).

28 Claims, 4 Drawing Sheets

MOTOR VEHICLE ELECTRIC SYSTEM

CROSS REFERENCE TO RELATED APPLICATION

This application is a continuation of copending International Application No. PCT/DE01/00601 filed Feb. 16, 2001 and claiming a priority date of Feb. 16, 2001, which designates the United States.

TECHNICAL FIELD OF THE INVENTION

The present invention relates to a motor vehicle electric system.

BACKGROUND OF THE INVENTION

A starter-generator in a motor vehicle can in principle be operated at a vehicle electric system voltage of 14 V (14 V or, more precisely, 14.4 V is the charging voltage of a 12 V battery). It is technically expedient in this respect to limit the power output and also the generator output to no more than 3 kW, as otherwise the vehicle electric system currents would be too high. A starter-generator can start the internal combustion engine and supply the electric loads during the journey at a vehicle electric system voltage of 14 V, but an output of more than 3 kW is required for additional functions such as boost (accelerate) or recuperation (braking). This output can only be realized with a higher vehicle electric system voltage. Consequently 42 V vehicle electric systems (42 V is the charging voltage of a 36 V battery) that permit greater electrical outputs are being developed.

An integrated starter-generator, abbreviated to ISG, is, for example, a three-phase asynchronous motor with electronic inverter, which asynchronous motor is connected directly to the crankshaft of the internal combustion engine at the flywheel and enables the generation of electrical energy in generator mode and the generation of mechanical motive power in motor mode. The three-phase asynchronous motor thus replaces both the known generator and the known starter. The available outputs increase considerably (6 kW as opposed to 2 kW with known generators), so the ISG enables extra functions in addition to starting the engine and supplying the vehicle electric system:

Boost (accelerate): Torque support for the internal combustion engine during the vehicle acceleration phase. The ISG offers a maximum torque of around 200 Nm, which is approximately equal to the torque of a 2-liter internal combustion engine. Currents of up to 270 A are required for around 15 seconds during the boost operation;

Recuperation (regenerative braking): The ISG dissipates kinetic energy during braking of the vehicle by generating electricity. Currents of up to 270 A are generated in this process for up to 30 seconds.

Model calculations indicate a saving on fuel of up to 20% when these new functions are used.

One major problem is the cost-effective implementation of an energy storage mechanism able to manage the high charging and discharging currents over the long term. It is estimated that there will be between 300,000 and 500,000 charging and discharging cycles over the lifetime of a motor vehicle (approximately 150,000 km).

Known 12 V motor vehicle electric systems are equipped with lead-acid batteries. This type of battery has a very limited cycling resilience, as the method it uses to transport energy, namely a transport of material (ions), entails notable losses. What this means is that the structure of the electrodes changes continuously as the active surface shrinks (loss of capacity) and material is lost. This loss of material leads to the deposition of lead sludge.

The batteries in the 14 V vehicle electric system are at the present time operated at an almost constant battery charge. The brief periods of current consumption for starting and idling are virtually insignificant. The principal function of the battery is effectively that of a substantial buffer capacitor that stabilizes the vehicle electric system thanks to its large capacity. The battery loses capacity only slowly and accordingly has a lifetime of many years.

The situation in the 42 V vehicle electric system with highly dynamic operation at the ISG is quite different. Model calculations suggest that a typical lead-acid battery can be expected to last for between 5,000 and 10,000 km. An empirical trial found that the battery survived a journey distance of 6,000 km before failing. It is also technically difficult to ensure charging capacity for currents of up to 270 A at all times. The result of this is that the battery must be replaced as part of every scheduled service of the vehicle and possibly even between scheduled services if lead-acid batteries are used for boost and recuperation. This is completely unacceptable.

A system with a 36 V lead-acid battery does have the lowest initial cost by some distance, but the follow-up costs that ensue over the lifetime of the vehicle are very high.

NiMH (nickel metal hydride) batteries are also suitable in principle for boost and recuperation, but the battery has to be significantly over-sized in order to achieve the requisite cycling resilience. If calculations show that a battery of 6 kW and 11 Ah is required to provide the energy or output needed, at least 14 Ah will be required to achieve the requisite cycling resilience. Unresolved problems include the issue of how to dissipate the heat generated by major charge replacement. It would not, moreover, be possible to make any significant saving on the initial costs due to the materials used.

Li-Ion (lithium ion) batteries promise much from a technical standpoint (energy density, weight, efficiency, etc.). Development work is already underway, but it will be several years before products suitable for use in automobiles become available. The costs identifiable today suggest that using Li-Ion batteries could be even more expensive than using NiMH batteries.

Only a few energy storage mechanisms are able to provide the required high number of cycles and high energy throughput (200,000 boost operations demand a total of around 12.6 MWh of energy or approximately 180,000 Ah). Double layer capacitors (DLC) are a suitable energy storage mechanism. Double layer capacitors are already available and are able to store and release the energy converted in boosting and recuperation. They are also able to manage the currents encountered in these operations without difficulty and their good efficiency means that self-heating is low.

The limited energy storage capacity of the double layer capacitor does, however, mean that an additional battery, for example a low cost lead-acid battery, is required. The lead-acid battery will not be exposed to cycling loads in this configuration and should therefore have a lifetime in line with the present standard.

A starting operation of 1 second draws approximately 2 Wh of energy from the energy storage mechanism. Statistical calculations indicate two starting operations per kilometer driven. Similarly, two boost operations are expected per kilometer driven when accelerating. A total of up to 63 Wh can be required here per boost operation with a 6 kW starter-generator. The maximum current in the starting operation can exceed 500 A and the maximum current in the boost operation can be more than 250 A.

It is disadvantageous, however, that energy can in principle be exchanged at the capacitor only by means of voltage variation. The capacitor voltage must be varied by 50% in order to move 75% of the charge (E=½ C*(U22−U12)). This would entail an unacceptable variation from 42 V (in the fully charged state) to 21 V for the 42 V vehicle electric system. Known designs consequently use a bi-directional DC/DC converter between the vehicle electric system and the double layer capacitor DLC to compensate for this shortcoming. This makes it possible to keep the 42 V vehicle electric system stable while the voltage at the double layer capacitor varies.

The combination of double layer capacitor and lead-acid battery is presently the most promising solution from the technical standpoint. The double layer capacitor and battery combination is expensive, however, and so is the bi-directional DC/DC converter, so the total cost of such a solution is likely to be considerable. The high costs involved have a number of effects, not least among which is that they delay the rapid implementation of this system in series-produced vehicles.

SUMMARY OF THE INVENTION

The object of the invention is to specify a motor vehicle electric system having a combination of double layer capacitor and low cost battery, which system manages with no expensive bi-directional DC/DC converter and thereby reduces system costs significantly.

This object can be achieved by a motor vehicle electric system comprising an internal combustion engine and, mechanically connected thereto, an integrated starter-generator that charges a double layer capacitor and a battery to a first voltage via a bi-directional AC/DC converter in generator mode and is driven by the energy stored in the double layer capacitor or in the battery in motor mode, wherein an intermediate circuit capacitor is arranged between the positive and negative direct voltage terminals of the bi-directional AC/DC converter, a first switch is provided via which the positive direct voltage terminal of the bi-directional AC/DC converter can be connected to the plus pole of the battery, the minus pole of which is grounded, and a second switch is provided via which the positive direct voltage terminal of the bi-directional AC/DC converter can be connected to the positive terminal of the double layer capacitor, the negative terminal of which is grounded.

The first and second switches can be interlinked in such a way that they cannot both be in the conducting position at the same time. The intermediate circuit capacitor can be charged from the AC/DC converter to a voltage value corresponding to the voltage at the double layer capacitor or the battery before the first or second switch is switched to the conducting position. The flow of current into the AC/DC converter or out of the AC/DC converter can be reduced to a minimal value before the first or second switch is switched to the non-conducting position. A regulator circuit can be provided by means of which the double layer capacitor can be recharged from the battery. The double layer capacitor can be charged to an elevated voltage higher than the voltage of the battery. An additional battery to supply additional loads with a second voltage can be provided, which additional battery is charged via a bi-directional DC/DC converter by the battery, wherein a third switch is provided via which the plus pole of the first battery can be connected to a positive terminal of the bi-directional DC/DC converter, and a fourth switch is provided via which the positive terminal of the double layer capacitor can be connected with the same positive terminal of the bi-directional DC/DC converter. The third and fourth switches can be interlinked in such a way that they cannot both be in the conducting position at the same time. A control/regulation circuit can be provided for controlling/regulating operations from the group of charging the intermediate circuit capacitor via the AC/DC converter to a voltage value corresponding to the voltage at the double layer capacitor or the 36 V battery, determining the working direction of the converters (step-up or step-down), and controlling the positions of switches S1 to S4.

When the integrated starter-generator is in a generator mode:

the intermediate circuit capacitor can be charged to a predefinable voltage when the switches are non-conducting, the battery can be charged when the first switch is conducting and the double layer capacitor can be charged when the second switch is conducting.

When the integrated starter-generator is in a motor mode:

the starter-generator can be driven with energy from the battery when the first switch is conducting and the starter-generator can be driven with energy from the double layer capacitor when the second switch is conducting.

The battery can charge or can be charged by the additional battery when the third switch is conducting and the double layer capacitor can charge or can be charged by the additional battery when the fourth switch is conducting.

The object can also be achieved by a method of operating a motor vehicle electric system comprising an integrated starter-generator comprising the steps of:

charging a double layer capacitor and a battery to a first voltage via a bi-directional AC/DC converter in a generator mode, driving the starter-generator by the energy stored in the double layer capacitor or in the battery in a motor mode, arranging an intermediate circuit capacitor between the positive and negative direct voltage terminals of the bi-directional AC/DC converter, providing a first switch via which the positive direct voltage terminal of the bi-directional AC/DC converter can be connected to the plus pole of the battery, the minus pole of which is grounded, and providing a second switch via which the positive direct voltage terminal of the bi-directional AC/DC converter can be connected to the positive terminal of the double layer capacitor, the negative terminal of which is grounded.

The method may further comprise the step of interlinking the first and second switches in such a way that they cannot both be in the conducting position at the same time. The method may further comprise the step of charging the intermediate circuit capacitor from the AC/DC converter to a voltage value corresponding to the voltage at the double layer capacitor or the battery before the first or second switch is switched to the conducting position. The method may further comprise the step of reducing the flow of current into the AC/DC converter or out of the AC/DC converter to a minimal value before the first or second switch is switched to the non-conducting position. The method may further comprise the step of recharging the double layer capacitor from the battery by a regulator circuit. The method may further comprise the step of charging the double layer capacitor to an elevated voltage higher than the voltage of the battery. The method may further comprise the steps of:

charging an additional battery via a bi-directional DC/DC converter by the battery, providing a third switch via which the plus pole of the first battery can be connected to a positive terminal of the bi-directional DC/DC converter, and providing a fourth switch via which the positive terminal of the double layer capacitor can be connected with the same positive terminal of the bi-directional DC/DC converter.

The method may further comprise the step of interlinking the third and fourth switches in such a way that they cannot both be in the conducting position at the same time. The method may further comprise the step of controlling/regulating operations from the group of:

charging the intermediate circuit capacitor via the AC/DC converter to a voltage value corresponding to the voltage at the double layer capacitor or the 36 V battery, determining the working direction of the converters (step-up or step-down), and controlling the positions of switches S1 to S4.

The method may further comprise the steps of when the integrated starter-generator is in generator mode:

charging the intermediate circuit capacitor to a predefinable voltage when the switches are non-conducting, charging the battery when the first switch is conducting and charging the double layer capacitor when the second switch is conducting and when the integrated starter-generator is in motor mode:

driving the starter-generator with energy from the battery when the first switch is conducting and driving the starter-generator with energy from the double layer capacitor when the second switch is conducting.

The method may further comprise the step of the battery charges or is charged by the additional battery when the third switch is conducting and the double layer capacitor charges or is charged by the additional battery when the fourth switch is conducting.

The particular advantage of the invention lies in the fact that the expensive bi-directional DC/DC converter is replaced by four (in the 42 V/14 V "two voltage" vehicle electric system) or two (in the 42 V "single voltage" vehicle electric system) controlled switches. The voltage present at the ISG output (the voltage present at an intermediate circuit capacitor C) and/or the current flowing to or from the ISG can be controlled, so switching can be completed in a virtually zero-power state, which reduces the demands placed on the switches quite considerably.

The integrated starter-generator ISG is isolated from the battery during boosting and recuperation and is instead connected to the double layer capacitor DLC. The loads are supplied by the battery in this operating mode.

The possibility of reciprocal load transfer between the 36 V battery, the double layer capacitor and the 12 V battery means that there is double redundancy for the energy supply in all areas of the vehicle electric system in the event of an emergency.

Raising the voltage at the double layer capacitor to the maximum permissible voltage at which no additional shock protection is required (60 V) yields the advantage that the starter-generator is able to provide a higher torque and the energy storage capacity of the double layer capacitor increases. This results in enhanced performance of the entire vehicle electric system.

BRIEF DESCRIPTION OF THE DRAWINGS

Embodiments in accordance with the invention are explained below in more detail with reference to a schematic drawing.

DETAILED DESCRIPTION OF THE PREFERRED EMBODIMENTS

Figure 1:
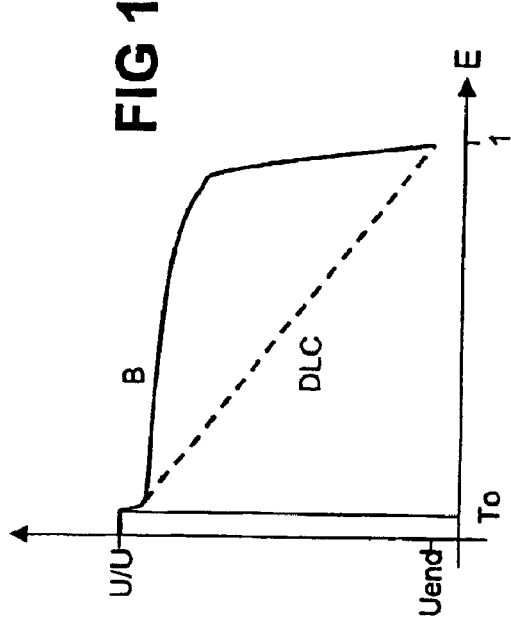
FIG. 1 shows the discharge voltage characteristic of the double layer capacitor and lead-acid battery.

FIG. 1 shows the voltage characteristic during discharging of a double layer capacitor DLC (dashed line) and a lead-acid battery B (solid line). The difference in the voltage characteristics of the capacitor and battery from time To means that it is not possible to join the two storage mechanisms directly in a vehicle electric system. They can only be joined using an additional actuator.

Figure 2:
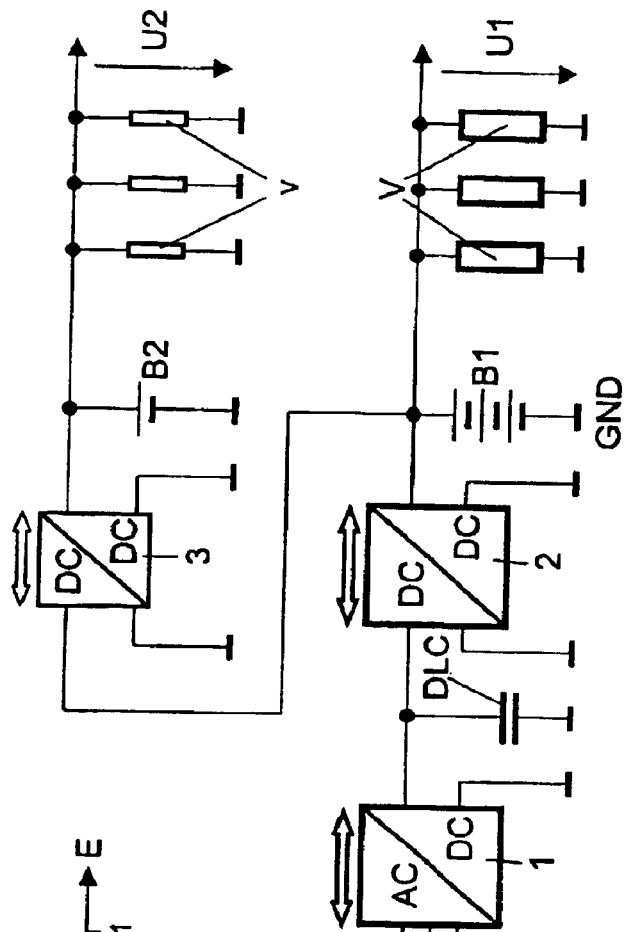
FIG. 2 shows the circuit diagram of a known 42 V/14 V motor vehicle electric system.

FIG. 2 shows a circuit diagram of a known 42 V/14 V motor vehicle electric system having an integrated starter-generator ISG in which a double layer capacitor DLC is used and in which a bi-directional DC/DC converter 2 is employed as additional actuator between said double layer capacitor and a 36 V battery B1.

The operations carried out using this circuit are controlled/regulated by a control/regulation circuit (not shown).

The integrated starter-generator ISG is an asynchronous motor that is coupled mechanically to an internal combustion engine BKM and is connected to the double layer capacitor DLC via a bi-directional AC/DC converter 1 (inverter). The double layer capacitor DLC is connected to the 36 V battery B1, at which a voltage U1 of 36/42 V is present (nominal voltage 36 V, fully charged 42 V), via the bi-directional DC/DC converter 2 already mentioned. This 36 V battery supplies consumers V such as electric valve operation, windshield heating, seat heating, climate control and, if the DLC is discharged, the ISG as starter, etc., which together constitute a relatively major load, directly and also supplies a 12 V battery B2 and the smaller loads v supplied by it.

The 36 V battery B1 is connected to this 12 V battery B2, which supplies the smaller loads v such as vehicle and dashboard lighting, etc. and at which a voltage U2 of 12/14 V is present (nominal voltage 12 V, fully charged 14.4 V), via a further, lower output bi-directional DC/DC converter 3.

When starting the internal combustion engine BKM and in boost mode (during acceleration), the ISG operates in motor mode (it drives the internal combustion engine BKM) and acquires the required energy from the double layer capacitor DLC (via the AC/DC converter 1) or, if the latter is not charged, from the 36 V battery B1 (via the DC/DC converter 2 and the AC/DC converter 1).

The ISG is driven by the internal combustion engine BKM in the normal driving mode and thus operates in generator mode and charges the energy storage mechanisms DLC, B1 and B1.

This demands little power in the normal driving mode.

The recharging operation proceeds at a higher power in the recuperation mode (during braking) and may reach the maximum power output of the ISG. This means a maximum charging current of more than 250 A for a 6 kW starter-generator. Statistical calculations indicate that two significant braking operations should be expected per kilometer driven.

The two DC/DC converters 2 and 3 are used in the normal mode only to charge the batteries B1, B2 and to supply the consumers V, v; that is to say they are used only in one direction. Both DC/DC converters 2 and 3 are, however, of a bi-directional, that is to say redundant, design in order that they can also charge the 36 V battery B1 from the 12 V battery and the DLC from the 36 V battery B1 or the 12 V battery B2 in the event of an emergency.

The DC/DC converter 2 entails additional weight and is very expensive. The entire energy supply for all vehicle loads has to pass through it (high efficiency requirement), so its capacity has to be equal to the vehicle loads. If the power consumption of the installed loads amounts to 4 kW, for example, the DC/DC converter must be designed for currents of up to 100 A. If the DLC is also to be used for energy storage and supply during boost and recuperation operations, moreover, the voltage at the DC/DC converter will fluctuate enormously. The DC/DC converter 2 must in such cases be designed to cope with these voltage fluctuations, which leads to a much more complex structure and elevated costs (bi-directional step-up/step-down voltage regulator).

Figure 3:
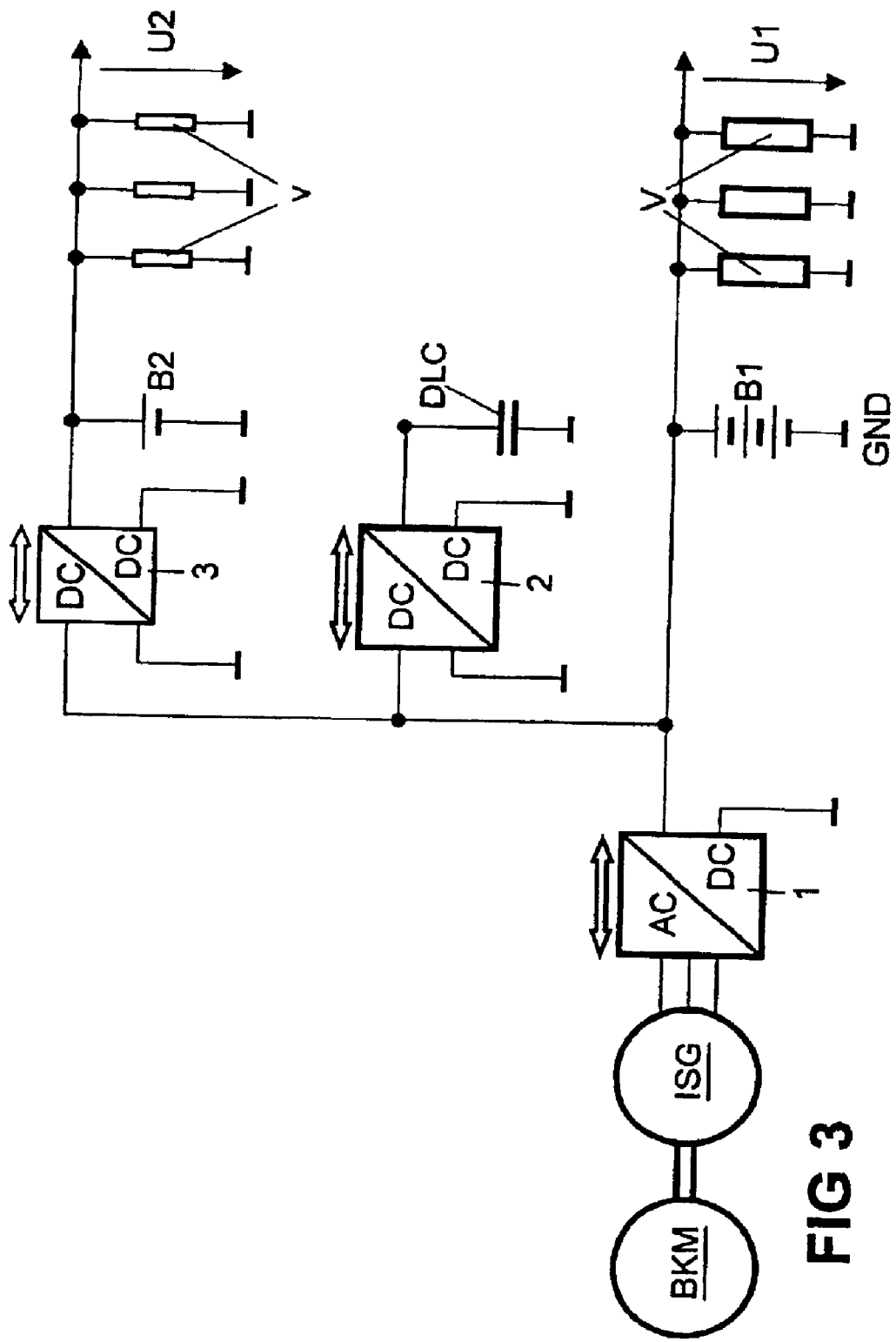
FIG. 3 shows the circuit diagram of an alternative 42 V/14 V motor vehicle electric system.

FIG. 3 shows another possible alternative for a 42 V/14 V motor vehicle electric system.

The double layer capacitor DLC in FIG. 3, however, in contrast to FIG. 2, is not connected directly to the AC/DC converter 1, but is rather isolated via the DC/DC converter 2. The 42 V motor vehicle electric system with the battery B1 and the consumers V and also the DC/DC converter 3 are connected directly to the output of the AC/DC converter 1. One serious disadvantage of this circuit variant is that here the DC/DC converter has to be designed for the considerably higher current (>250 A) encountered during boost and recuperation and, as in the example according to FIG. 2, has to be a bi-directional step-up/step-down voltage regulator. This leads to a further increase in costs.

Figure 4:
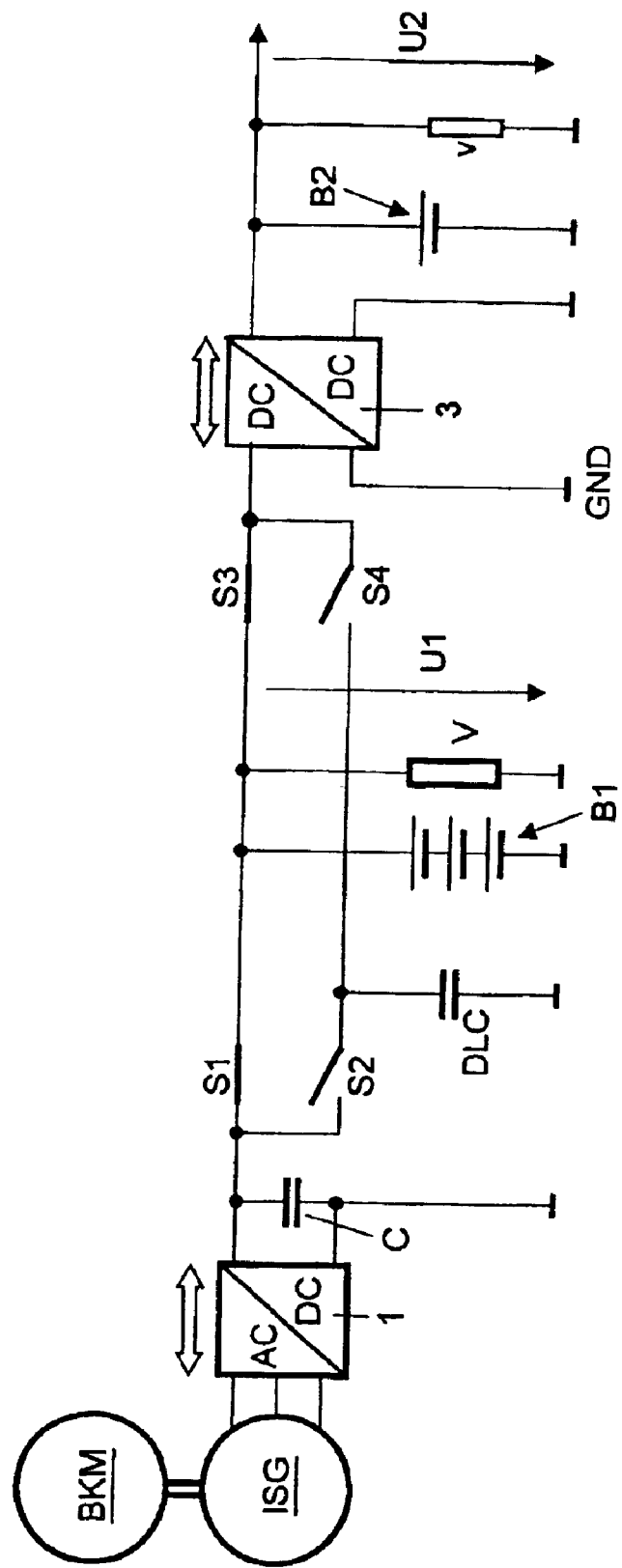
FIG. 4 shows the circuit diagram of a 42 V/14 V motor vehicle electric system according to the invention.

FIG. 4 shows the circuit diagram of a 42 V/14 V motor vehicle electric system (a "two voltage" motor vehicle electric system) according to the invention having an integrated starter-generator ISG mechanically connected to the internal combustion engine BKM, which integrated starter-generator is followed by a bi-directional AC/DC converter 1 between the two outputs of which is connected an intermediate circuit capacitor C. The negative terminal of the intermediate circuit capacitor C and the negative direct voltage terminal of the AC/DC converter 1 are connected to each other and to the circuit ground GND.

The positive terminal of the intermediate circuit capacitor C and the positive direct voltage terminal of the AC/DC converter 1 are connected to each other and lead to two parallel switches S1 and S2.

The first switch S1 connects the positive terminal of the AC/DC converter 1 to the positive pole of a 36 V battery B1, to the loads V (the other terminals of which are connected to ground GND) arranged in parallel therewith and to a third switch S3.

The second switch S2 connects the positive terminal of the AC/DC converter 1 to the positive terminal of a double layer capacitor DLC, the negative terminal of which is connected to ground GND, and to a fourth switch S4.

The two other terminals of the third and fourth switches S3, S4 are connected to each other and to a positive terminal of the second DC/DC converter 3. The rest of the circuit is the same as the circuit shown in FIG. 2.

The operations carried out using this circuit, in particular the determination of the working direction of the converters (step-up or step-down), the charging of the intermediate circuit capacitor C to a certain voltage value and the positions of the four switches S1 to S4, are also controlled/regulated by a control/regulation circuit (not shown).

The switches S1 and S2 establish the connection between the integrated starter-generator ISG and the double layer capacitor DLC and/or the 36 V battery B1. Switch S3 establishes a connection between the 36 V battery B1 and the 12 V battery B2, while switch S4 enables an additional link between the double layer capacitor DLC and the 12 V battery B2.

The following positions of the switches S1 and S2 are possible:

Switch S1 and Switch S2 Non-Conducting:

The voltage of the intermediate circuit capacitor C can be influenced by controlling the jumpers of the AC/DC converter 1 and thereby matched to the voltage of the double layer capacitor DLC and/or of the 36 V battery B1. The voltage at the ISG output (the voltage present at an intermediate circuit capacitor C) can be controlled, so switching can be completed in a virtually zero-power state (closing in the de-energized state).

It is likewise possible by controlling the jumpers of the AC/DC converter 1 before opening the switch S1 or S2 to reduce the flow of current through the AC/DC converter 1 to close to zero so that the switch is opened in the de-energized state. This reduces the demands placed on the switches quite considerably.

Switch S1 Conducting and Switch S2 Non-Conducting:

This is the normal operating mode for driving, as shown in FIG. 4. Normal generator operation without recuperation with the switches in this position allows the 36 V battery B1 to be charged and the 14/42 V motor vehicle electric system to be supplied from the ISG.

Discharging or charging of the 36 V battery B1 via the AC/DC converter 1 during boosting or recuperation is possible in theory, but this operating mode should be avoided due to the limited cycling resilience of the 36 V battery B1.

Switch S1 Non-Conducting and Switch S2 Conducting:

Discharging or charging of the double layer capacitor DLC via the AC/DC converter 1 during boosting (acceleration) or recuperation (braking). It is not possible to take energy from the 36 V battery B1 for a boost operation with the switches in this position. The 36 V battery B1 cannot receive any energy during recuperation. The electrical supply for the vehicle electric system loads V (and of the 12 V battery B2 and of the loads v connected to it) comes from the 36 V battery B1.

Switch S1 Conducting and Switch S2 Conducting:

This is an impermissible switch position. It would require an identical voltage level between the double layer capacitor DLC and the 36 V battery B1. If the voltages were not the same, it would be impossible to prevent the emergence of high compensating currents between the double layer capacitor DLC and the 36 V battery B1. Switches S1 and S2 should consequently be interlinked in such a way as to prevent the occurrence of this switch position.

Switch S3 and Switch S4 Non-Conducting:

The 14 V vehicle electric system is isolated from the 42 V vehicle electric system with the switches in this position. S3 and S4 can thus also perform a polarity reversal protection function.

Switch S3 Conducting and Switch S4 Non-Conducting:

This is the normal operating mode for driving. This switch position allows charging of the 12 V battery B2 from the 36 V battery B1. The bi-directional DC/DC converter 3, which connects the 36 V battery B1 and the 12 V battery B2, operates in step-down mode.

Switching the DC/DC converter to step-up mode makes it possible to recharge a discharged 36 V battery from the 12 V battery.

Switch S3 Non-Conducting and Switch S4 Conducting:

If the double layer capacitor DLC is discharged, for example after the vehicle has been left unused for a prolonged period, this switch position allows the double layer capacitor DLC to be recharged from the 12 V battery B2 via the DC/DC converter 3. The DC/DC converter 3 operates here in step-up mode. This makes it possible, subject to the charge of the 12 V battery, to maintain the charge at the DLC Switch S3 and Switch S4 Conducting:

This is an impermissible switch position. These two switches must not be allowed to be in the conducting position at the same time, as this would lead to equipotential bonding between the 36 V battery B1 and the double layer capacitor DLC. The compensating currents would be very high. Switches S3 and S4 should consequently be interlinked in such a way as to prevent the occurrence of this switch position.

The straightforward integration of the double layer capacitor, with its high performance and high cycling resilience, into a vehicle electric system having a starter-generator ISG using just a few additional electric components is a particular advantage of the invention.

The particularly expensive DC/DC converter 2 is replaced by a small number of switches that can, in the simplest case, be realized using inexpensive relays or controlled switching transistors.

This circuit reduces the cycling frequency of the 36 V battery B1 significantly and transfers the cycling to the double layer capacitor DLC, which has adequate cycling resilience for the purpose. This reduces the load on the 42 V vehicle electric system significantly. Large voltage fluctuations associated with start-stop mode, boost mode and recuperation mode occur only locally at the starter-generator ISG and the double layer capacitor DLC.

The upper and lower voltage thresholds as per the Sican/VDA recommendation of 48 V and 30 V respectively relate not to the ISG, but rather only to the voltage of the 42 V vehicle electric system, which is unaffected by this configuration. The voltage of the starter-generator ISG and the double layer capacitor DLC can though be higher temporarily in order to enhance the performance of these two components. The maximum voltage should remain below 60 V (the maximum permissible voltage at which no additional shock protection is required). This yields the advantage that the starter-generator ISG is able to provide a higher torque and the energy storage capacity of the double layer capacitor DLC, which is a square-law function of the voltage, increases. This results in enhanced performance of the entire ISG vehicle electric system.

Future vehicle electric systems will have just one 42 V vehicle electric system instead of a dual 42/14 V vehicle electric system.

Figure 5:
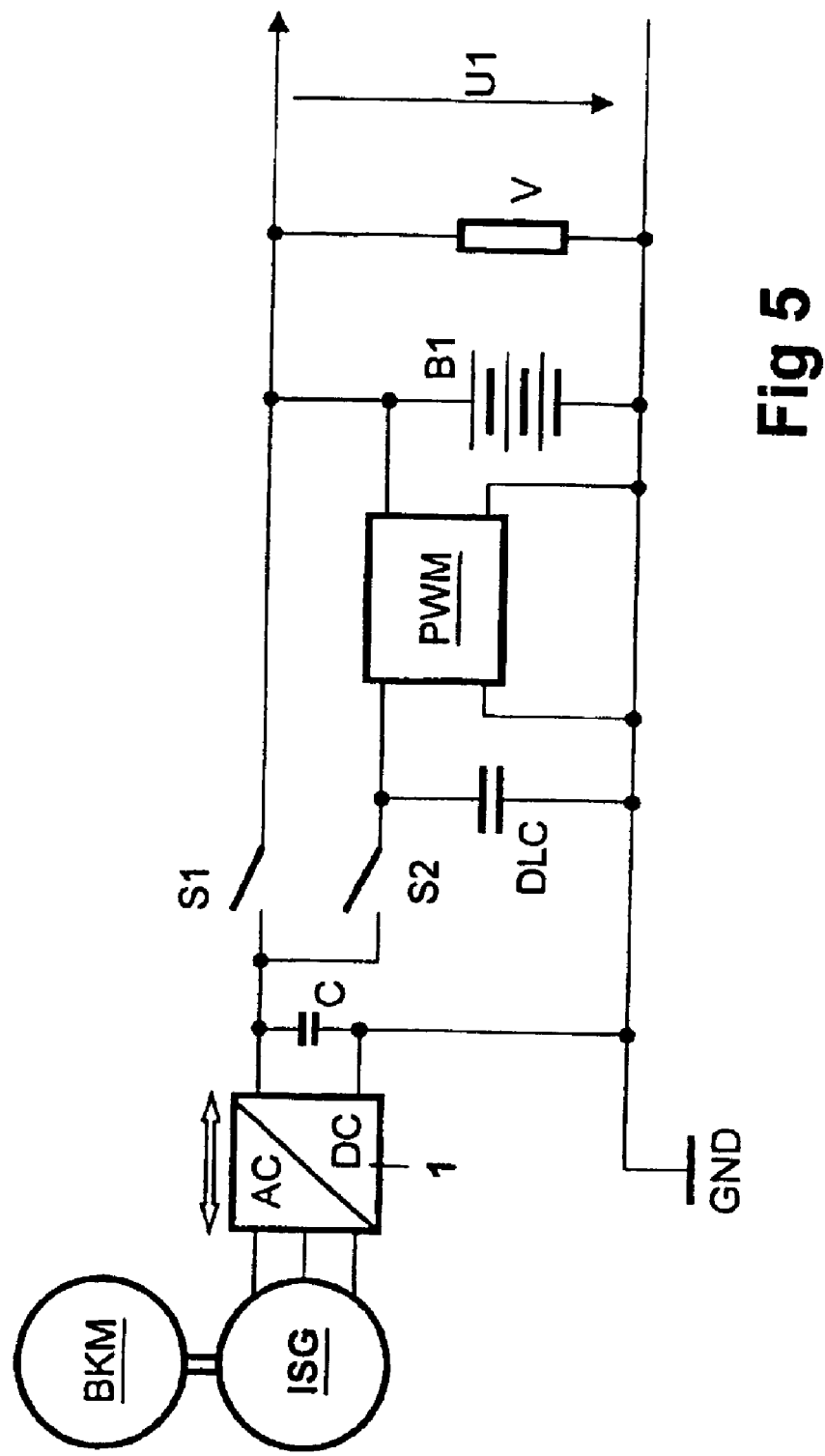
FIG. 5 shows a circuit diagram of a 42 V motor vehicle electric system according to the invention.

FIG. 5 shows an exemplary embodiment according to the invention for a pure 42 V vehicle electric system. The switches S3 and S4, the 12 V battery B2 and the bi-directional DC/DC converter 3 are omitted. Only loads V now remain, all of which can be operated at a voltage of 36/42 V.

The circuit provided for this purpose largely corresponds to the part circuit shown in FIG. 3 to the left of the voltage arrow U1. The double layer capacitor DLC is recharged from the 36 V battery B1 via a DC/DC converter, which can in the simplest case be a small pulse-width modulated regulator PWM. The converter is inserted between the positive terminals of the battery B1 and the double layer capacitor DLC and operates, when the DLC is discharged, only until the voltage at the DLC approximately equals the battery voltage U1 (or a maximum voltage of <60 V). This is necessary in particular after long periods without use (self-discharging of the double layer capacitor) in order to ensure a reliable starting operation. The switches S1 and S2 continue to function as described for the dual 42/14 V vehicle electric system according to FIG. 3.

What is claimed is:

1. A motor vehicle electric system comprising
an internal combustion engine and, mechanically connected thereto, an integrated starter-generator that charges a double layer capacitor and a first battery to a first voltage via a bi-directional AC/DC converter in generator mode and is driven by the energy stored in the double layer capacitor or in the battery in motor mode, an intermediate circuit capacitor is arranged between the positive and negative direct voltage terminals of the bi-directional AC/DC converter, a first switch is provided via which the positive direct voltage terminal of the bi-directional AC/DC converter can be connected to the plus pole of the battery, the minus pole of the AC/DC converter is grounded, and a second switch is provided via which the positive direct voltage terminal of the bi-directional AC/DC converter can be connected to the positive terminal of the double layer capacitor, the negative terminal of said AC/DC converter is grounded.

2. A motor vehicle electric system according to claim 1, wherein the first and second switches are interlinked in such a way that they cannot both be in the conducting position at the same time.

3. A motor vehicle electric system according to claim 1, wherein the intermediate circuit capacitor can be charged from the AC/DC converter to a voltage value corresponding to the voltage at the double layer capacitor or the first battery before the first or second switch is switched to the conducting position.

4. A motor vehicle electric system according to claim 1, wherein the flow of current into the AC/DC converter or out of the AC/DC converter can be reduced to a minimal value before the first or second switch is switched to the non-conducting position.

5. A motor vehicle electric system according to claim 1, wherein the double layer capacitor is charged to an elevated voltage higher than the voltage of the first battery.

6. Motor vehicle electric system according to claim 1, comprising an additional battery to supply additional loads with a second voltage, which additional battery is charged via a bi-directional DC/DC converter by the battery, wherein a third switch is provided via which the plus pole of the first battery can be connected to a positive terminal of the bi-directional DC/DC converter, and a fourth switch is provided via which the positive terminal of the double layer capacitor can be connected with the same positive terminal of the bi-directional DC/DC converter.

7. A motor vehicle electric system according to claim 1, wherein the third and fourth switches are interlinked in such a way that they cannot both be in the conducting position at the same time.

8. Motor vehicle electric system according to claim 1, comprising a control/regulation circuit for controlling/regulating operations from the group of
- charging the intermediate circuit capacitor via the AC/DC converter to a voltage value corresponding to the voltage at the double layer capacitor or the 36 V battery,
- determining the working direction of the converters (step-up or step-down), and
- controlling the positions of switches S1 to S4.

9. A motor vehicle electric system according to claim 1, wherein
- when the integrated starter-generator is in generator mode:
- the intermediate circuit capacitor is charged to a predefinable voltage when the switches are non-conducting,
- the first battery is charged when the first switch is conducting and
- the double layer capacitor is charged when the second switch is conducting and
- when the integrated starter-generator is in motor mode:
- the starter-generator is driven with energy from the first battery when the first switch is conducting and
- the starter-generator is driven with energy from the double layer capacitor when the second switch is conducting.

10. A motor vehicle electric system according to claim 1, wherein
- the first battery charges or is charged by the second battery when the third switch is conducting and
- the double layer capacitor charges or is charged by the second battery when the fourth switch is conducting.

11. Motor vehicle electric system according to claim 7, wherein
- the first battery charges or is charged by the second battery when the third switch is conducting and
- the double layer capacitor charges or is charged by the second battery when the fourth switch is conducting.

12. A method of operating a motor vehicle electric system comprising an integrated starter-generator, the steps-of comprising:
- charging a double layer capacitor and a battery to a first voltage via a bi-directional AC/DC converter in a generator mode,
- driving the starter-generator by the energy stored in the double layer capacitor or in the battery in a motor mode,
- arranging an intermediate circuit capacitor between the positive and negative direct voltage terminals of the bi-directional AC/DC converter,
- providing a first switch via which the positive direct voltage terminal of the bi-directional AC/DC converter can be connected to the plus pole of the battery, the minus pole of the AC/DC converter is grounded, and
- providing a second switch via which the positive direct voltage terminal of the bi-directional AC/DC converter can be connected to the positive terminal of the double layer capacitor, the negative terminal of the AC/DC converter is grounded.

13. A method according to claim 12, further comprising the step of interlinking the first and second switches in such a way that they cannot both be in the conducting position at the same time.

14. A method according to claim 12, further comprising the step of charging the intermediate circuit capacitor from the AC/DC converter to a voltage value corresponding to the voltage at the double layer capacitor or the battery before the first or second switch is switched to the conducting position.

15. A method according to claim 12, further comprising the step of reducing the flow of current into the AC/DC converter or out of the AC/DC converter to a minimal value before the first or second switch is switched to the non-conducting position.

16. A method according to claim 12, further comprising the step of charging the double layer capacitor to an elevated voltage higher than the voltage of the battery.

17. Method according to claim 12, further comprising the steps of:
- charging an additional battery via a bi-directional DC/DC converter by the battery,
- providing a third switch via which the plus pole of the first battery can be connected to a positive terminal of the bi-directional DC/DC converter, and
- providing a fourth switch via which the positive terminal of the double layer capacitor can be connected with the same positive terminal of the bi-directional DC/DC converter.

18. A method according to claim 17, further comprising the step of interlinking the third and fourth switches in such a way that they cannot both be in the conducting position at the same time.

19. A method according to claim 12, further comprising the steps of:
- charging the intermediate circuit capacitor via the AC/DC converter to a voltage value corresponding to the voltage at the double layer capacitor or the 36 V battery,
- determining the working direction of the converters (step-up or step-down), and
- controlling the positions of the switches.

20. Method according to claim 12, further comprising the steps of
- when the integrated starter-generator is in generator mode:
- charging the intermediate circuit capacitor to a predefinable voltage when the switches are non-conducting,
- charging the battery when the first switch is conducting and
- charging the double layer capacitor when the second switch is conducting and
- when the integrated starter-generator is in motor mode:
- driving the starter-generator with energy from the battery when the first switch is conducting and
- driving the starter-generator with energy from the double layer capacitor when the second switch is conducting.

21. Method according to claim 17, further comprising the step of
- the battery charges or is charged by the additional battery when the third switch is conducting and
- the double layer capacitor charges or is charged by the additional battery when the fourth switch is conducting.

22. Method according to claim 18, further comprising the step of
- the battery charges or is charged by the additional battery when the third switch is conducting and
- the double layer capacitor charges or is charged by the additional battery when the fourth switch is conducting.

23. A motor vehicle electric system comprising an internal combustion engine and, mechanically connected thereto, an integrated starter-generator that charges a double layer capacitor and a battery to a first voltage via a bi-directional AC/DC converter in generator mode and is driven by the energy stored in the double layer capacitor or in the battery in motor mode, wherein an intermediate circuit capacitor is arranged between the positive and negative direct voltage terminals of the bi-directional AC/DC converter, a first switch is provided via which the positive direct voltage terminal of the bi-directional AC/DC converter can be connected to the plus pole of the battery, the minus pole of the converter is grounded, and a second switch is provided via which the positive direct voltage terminal of the bi-directional AC/DC converter can be connected to the positive terminal of the double layer capacitor, the negative terminal of the converter is grounded, whereby the system is operable to charge the intermediate circuit capacitor via the AC/DC converter to a voltage value corresponding to the voltage at the double layer capacitor or the 36 V battery, determine the working direction of the converters (step-up or step-down), and control the positions of switches.

24. A motor vehicle electric system comprising an internal combustion engine and, mechanically connected thereto, an integrated starter-generator that charges a double layer capacitor and a battery to a first voltage via a bi-directional AC/DC converter in generator mode and is driven by the energy stored in the double layer capacitor or in the battery in motor mode, wherein an intermediate circuit capacitor is arranged between the positive and negative direct voltage terminals of the bi-directional AC/DC converter, a first switch is provided via which the positive direct voltage terminal of the bi-directional AC/DC converter can be connected to the plus pole of the battery, the minus pole of the converter is grounded, and a second switch is provided via which the positive direct voltage terminal of the bi-directional AC/DC converter can be connected to the positive terminal of the double layer capacitor, the negative terminal of the converter is grounded wherein when the integrated starter-generator is in generator mode:

the intermediate circuit capacitor is charged to a predefinable voltage when the switches are non-conducting, the battery is charged when the first switch is conducting, the double layer capacitor is charged when the second switch is conducting, and when the integrated starter-generator is in motor mode:

the starter-generator is driven with energy from the battery when the first switch is conducting, and the starter-generator is driven with energy from the double layer capacitor when the second switch is conducting.

25. A method of operating a motor vehicle electric system comprising an integrated starter-generator comprising the steps of:

charging a double layer capacitor and a battery to a first voltage via a bi-directional AC/DC converter in a generator mode, driving the starter-generator by the energy stored in the double layer capacitor or in the battery in a motor mode, arranging an intermediate circuit capacitor between the positive and negative direct voltage terminals of the bi-directional AC/DC converter, providing a first switch via which the positive direct voltage terminal of the bi-directional AC/DC converter can be connected to the plus pole of the battery, the minus pole of the converter is grounded, providing a second switch via which the positive direct voltage terminal of the bi-directional AC/DC converter can be connected to the positive terminal of the double layer capacitor, the negative terminal of the converter is grounded, charging an additional battery via a bi-directional DC/DC converter by the battery, providing a third switch via which the plus pole of the first battery can be connected to a positive terminal of the bi-directional DC/DC converter, and providing a fourth switch via which the positive terminal of the double layer capacitor can be connected with the same positive terminal of the bi-directional DC/DC converter.

26. A method according to claim 25, further comprising the step of interlinking the third and fourth switches in such a way that they cannot both be in the conducting position at the same time.

27. A method according to claim 25, further comprising the step of the battery charges or is charged by the additional battery when the third switch is conducting, and the double layer capacitor charges or is charged by the additional battery when the fourth switch is conducting.

28. A method according to claim 26, further comprising the step of the battery charges or is charged by the additional battery when the third switch is conducting, and the double layer capacitor charges or is charged by the additional battery when the fourth switch is conducting.

\* \* \* \* \*